United States Patent
Yurgil (10) Patent No.: US 7,891,168 B2
(45) Date of Patent: Feb. 22, 2011

(54) FLEXIBLE FUEL TOLERANT CATALYTIC CONVERTER DIAGNOSTIC METHOD

(75) Inventor: James R. Yurgil, Livonia, MI (US)

(73) Assignee: GM Global Technology Operations, Inc.

( * ) Notice: Subject to any disclaimer, the term of this patent is extended or adjusted under 35 U.S.C. 154(b) by 1104 days.

(21) Appl. No.: 11/561,487

(22) Filed: Nov. 20, 2006

(65) Prior Publication Data
US 2008/0115486 A1    May 22, 2008

(51) Int. Cl.
*F01N 3/00* (2006.01)
*F01N 3/10* (2006.01)

(52) U.S. Cl. .............. 60/277; 60/274; 60/276; 60/285; 60/299

(58) Field of Classification Search ........... 60/276, 60/277, 285, 273, 299, 274
See application file for complete search history.

(56) References Cited

U.S. PATENT DOCUMENTS

| | | | | |
|---|---|---|---|---|
| 5,303,685 A * | 4/1994 | Forgacs | .................... | 123/510 |
| 5,809,967 A * | 9/1998 | Masubuchi | ............ | 123/406.44 |
| 6,263,666 B1 * | 7/2001 | Kubo et al. | ................... | 60/277 |
| 6,412,472 B1 * | 7/2002 | Tilagone et al. | .......... | 123/406.3 |
| 6,874,313 B2 * | 4/2005 | Yurgil et al. | ................... | 60/277 |
| 7,159,623 B1 * | 1/2007 | Carr et al. | .................... | 141/94 |
| 2006/0236976 A1 * | 10/2006 | Carlson | ................. | 123/406.47 |

* cited by examiner

*Primary Examiner*—Thomas E Denion
*Assistant Examiner*—Audrey Klasterka (57) ABSTRACT

A monitoring system for a catalytic converter is provided. The system includes: a fuel determination module that determines a fuel composition based on a sensed composition of fuel in a fuel system; a fuel/air (F/A) determination module that selectively determines a stoichiometric F/A ratio based on the fuel composition; and an oxygen storage capacity (OSC) diagnostic module that computes a target OSC based on the stoichiometric F/A ratio, that compares the target OSC to a reference value and diagnosis the catalytic converter based on the comparison.

20 Claims, 7 Drawing Sheets

FLEXIBLE FUEL TOLERANT CATALYTIC CONVERTER DIAGNOSTIC METHOD

FIELD

The present disclosure relates to diagnostic systems for vehicles, and more particularly to methods and systems for monitoring catalytic converter efficiency.

BACKGROUND

The statements in this section merely provide background information related to the present disclosure and may not constitute prior art.

Ethanol, also know as ethyl alcohol, is a flammable, colorless chemical compound that can be mixed with gasoline to fuel an internal combustion engine. Flexible fuel vehicles include adaptations that allow the vehicle to run on various blends of gasoline and ethanol. For example, E85 fuel contains a mixture of 85% ethanol and 15% gasoline. A virtual flex fuel sensor and method detects the concentration of ethanol in the fuel. Based on the concentration level, the air/fuel ratio is adjusted and the engine operation is controlled accordingly.

During the combustion process, gasoline and ethanol are oxidized and hydrogen (H) and carbon (C) combine with air. Various chemical compounds are formed and released in an exhaust stream including carbon dioxide ($CO_2$), water ($H_2O$), carbon monoxide (CO), nitrogen oxides ($NO_x$), unburned hydrocarbons (HC), sulfur oxides ($SO_x$), and other compounds. However, the use of ethanol in the fuel reduces the amount of carbon dioxide (CO) and nitrogen oxides ($NO_x$) in the exhaust.

Automobile exhaust systems include a catalytic converter that further reduces the levels of CO, HC, and NOx in the exhaust gas by chemically converting these gasses into carbon dioxide, nitrogen, and water. Diagnostic regulations require periodic monitoring of the catalytic converter for proper conversion capability. Typical monitoring methods employ two exhaust gas oxygen sensors and infer the conversion capability of the catalytic converter using the sensor signals. One sensor monitors the oxygen level associated with an inlet exhaust stream of the catalytic converter. This inlet $O_2$ sensor is also the primary feedback mechanism that maintains the fuel-to-air (F/A) ratio of the engine at the chemically correct, or stoichiometric F/A ratio needed to support the catalytic conversion processes. A second or outlet $O_2$ sensor monitors the oxygen level concentration of the exhaust stream exiting the catalytic converter. Excess $O_2$ concentration in the exiting exhaust stream induces a "lean" sensor signal. A deficit or absence of $O_2$ in the exiting exhaust stream induces a "rich" sensor signal.

Traditional catalytic converter monitoring methods relate the empirical relationships that exist between the inlet and outlet $O_2$ sensor to quantify catalyst conversion capability. These methods compare sensor amplitude, response time, response rate, and/or frequency content data. All of these measurements are affected by a property of a catalytic converter known as Oxygen Storage Capacity (OSC). OSC refers to the ability of a catalytic converter to store excess oxygen under lean conditions and to release oxygen under rich conditions. The amount of oxygen storage and release decreases as the conversion capability of the catalytic converter is reduced. Therefore, the loss in OSC is related to the loss in conversion capability.

Methods and systems for monitoring a catalytic converter based on the OSC are described in commonly assigned U.S. Pat. No. 6,874,313. The methods and systems relate to various types of hydrocarbon fuels. As implemented, the methods and systems may not properly diagnose a catalytic converter for engine systems running alternative fuels such as E85 or diesel.

SUMMARY

Accordingly, a monitoring system for a catalytic converter is provided. The system includes: a fuel determination module that determines a fuel type based on a composition of fuel in a fuel system; a fuel/air (F/A) determination module that selectively determines a stoichiometric F/A ratio based on the fuel type; and an oxygen storage capacity (OSC) diagnostic module that computes a target OSC based on the stoichiometric F/A ratio, that compares the target OSC to a reference value and diagnosis the catalytic converter based on the comparison.

In other features, a method of diagnosing a catalytic converter is provided. The method includes: selectively determining a stoichiometric fuel/air ratio based on a fuel type; computing a target oxygen storage capacity (OSC) of the catalytic converter based on the stoichiometric fuel/air ratio; and diagnosing the catalytic converter based on the oxygen storage capacity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, and/or a processor (shared, dedicated, or group) and memory that executes one or more software or firmware programs.

Figure 1:
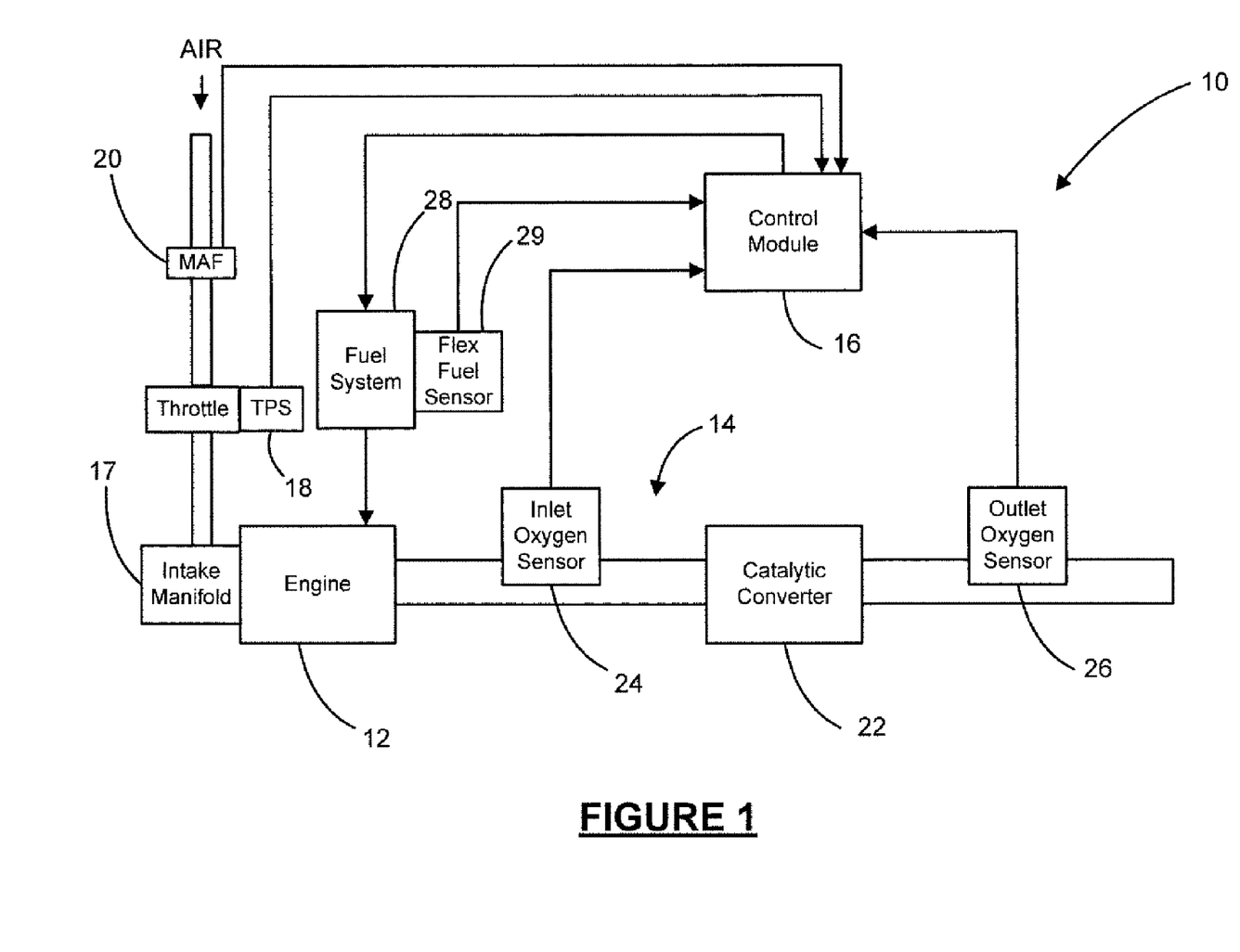
FIG. 1 is a functional block diagram of a vehicle including a control module that performs a flexible fuel tolerant catalytic converter diagnostic method according to the present disclosure.

Referring now to FIG. 1, a vehicle 10 includes an engine 12, an exhaust system 14, and a control module 16. The engine 12 includes an intake manifold 17, a throttle position sensor (TPS) 18, and a mass air flow (MAF) sensor 20. The throttle position sensor 18 and the MAF sensor 20 communicate with the control module 16. The exhaust system 14 includes a catalytic converter 22, a pre-catalyst or inlet oxygen sensor 24, and a post-catalyst or outlet oxygen sensor 26. The inlet and outlet oxygen sensors 24, 26 communicate with the control module 16 to provide inlet and outlet F/A ratio signals, respectfully. The control module 16 communicates with a fuel system 28 to regulate fuel flow to the engine 12. The fuel system includes a flex fuel sensor 29. The flex fuel sensor 29 generates a fuel signal to the control module 16 indicating a composition of the fuel in the fuel system 28. Alternatively, the vehicle may employ a virtual flex fuel sensor method in the control module 16 that utilizes a learned shift in fuel trim calculated from the inlet oxygen sensor 24 to estimate the fuel composition. In this manner, the control module 16 determines or estimates the stoichiometric F/A ratio of the engine 12. In addition, the control module 16 diagnoses the catalytic converter 22 of the exhaust system 14 based on a flexible fuel tolerant catalytic converter diagnostic method described herein.

Figure 2:
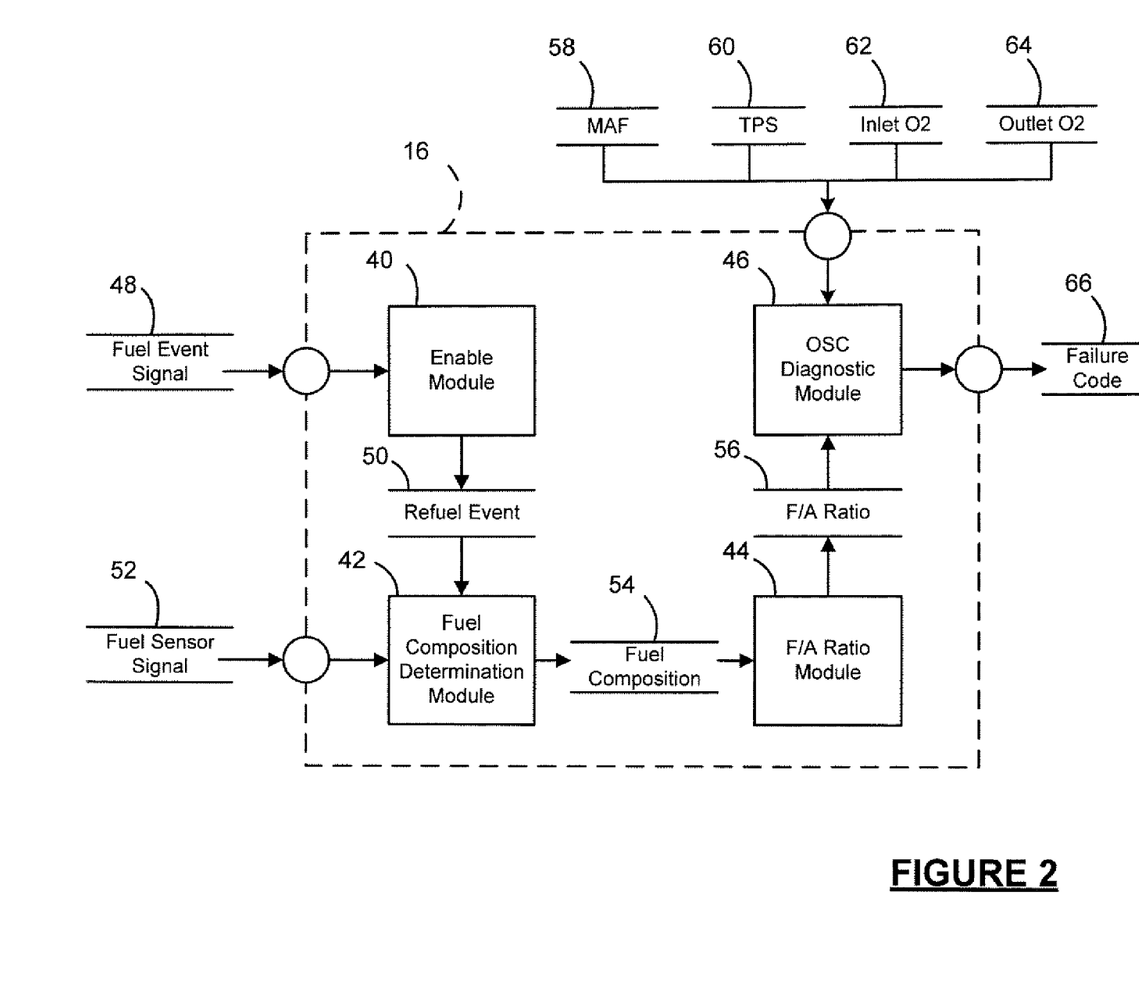
FIG. 2 is a dataflow diagram illustrating a flexible fuel tolerant catalytic converter diagnostic system.

Referring now to FIG. 2, a dataflow diagram illustrates various embodiments of a flexible fuel tolerant catalytic converter diagnostic system that may be embedded within the control module 16. Various embodiments of catalytic converter diagnostic systems according to the present disclosure may include any number of sub-modules embedded within the control module 16. The sub-modules shown may be combined and/or further partitioned to similarly monitor a catalytic converter 22. Inputs to the system may be received from sensors within the vehicle 10, received from other control modules (not shown) within the vehicle 10, and/or determined by other sub-modules (not shown) within the control module 16. In various embodiments, the control module 16 of FIG. 2 includes an enable module 40, a fuel determination module 42, a fuel/air (F/A) ratio module 44, and an oxygen storage capacity (OSC) diagnostic module 46.

The enable module 40 receives as input a fuel event signal 48. The fuel event signal 48 indicates a status of the remaining fuel in the fuel system 28 (FIG. 1). The enable module 40 determines when a refuel event has occurred based on the fuel event signal 48 and sets a refuel event flag 50 accordingly. In various embodiments, the fuel event signal 48 indicates a current fuel level of the fuel system 28 (FIG. 1). The enable module 40 compares the current fuel level to a previous fuel level to determine when a refuel event occurs. It is appreciated, that other methods may be used to detect a refuel event. The fuel determination module 42 receives as input the refuel event flag 50 and a fuel sensor signal 52 indicating a composition of the fuel in the fuel system 28 (FIG. 1). The fuel determination module 42 determines a fuel composition 54 of the fuel in the fuel system 28 (FIG. 1) after a refuel event has occurred and based on the fuel sensor signal 52. In various embodiments, the fuel determination module 42 estimates a composition of fuel based on engine operating parameters (i.e., fuel trim shift values) and determines the fuel composition 54 based on the estimated composition. These methods eliminate the need for the fuel sensor signal 52.

The F/A ratio module 44 receives as input the fuel composition 54. Based on the fuel composition 54, the F/A ratio module 44 determines the ideal stoichiometric F/A ratio 56. The OSC diagnostic module 46 receives as input the stoichiometric F/A ratio 56, mass airflow (MAF) 58, throttle position (TPS) 60, inlet $O_2$ sensor signal 62 and the outlet $O_2$ sensor signal 64. Based on the received signals, the OSC diagnostic module 46 determines an oxygen storage capacity for the catalytic converter 22 (FIG. 1) and diagnosis the catalytic converter 22 (FIG. 1) based on a comparison of the determined OSC and a reference value. Based on the diagnosis, the OSC diagnostic module 46 sets a failure code 66. Wherein the failure code 66 is set to TRUE or "test fail" if a malfunction is diagnosed.

Figure 3:
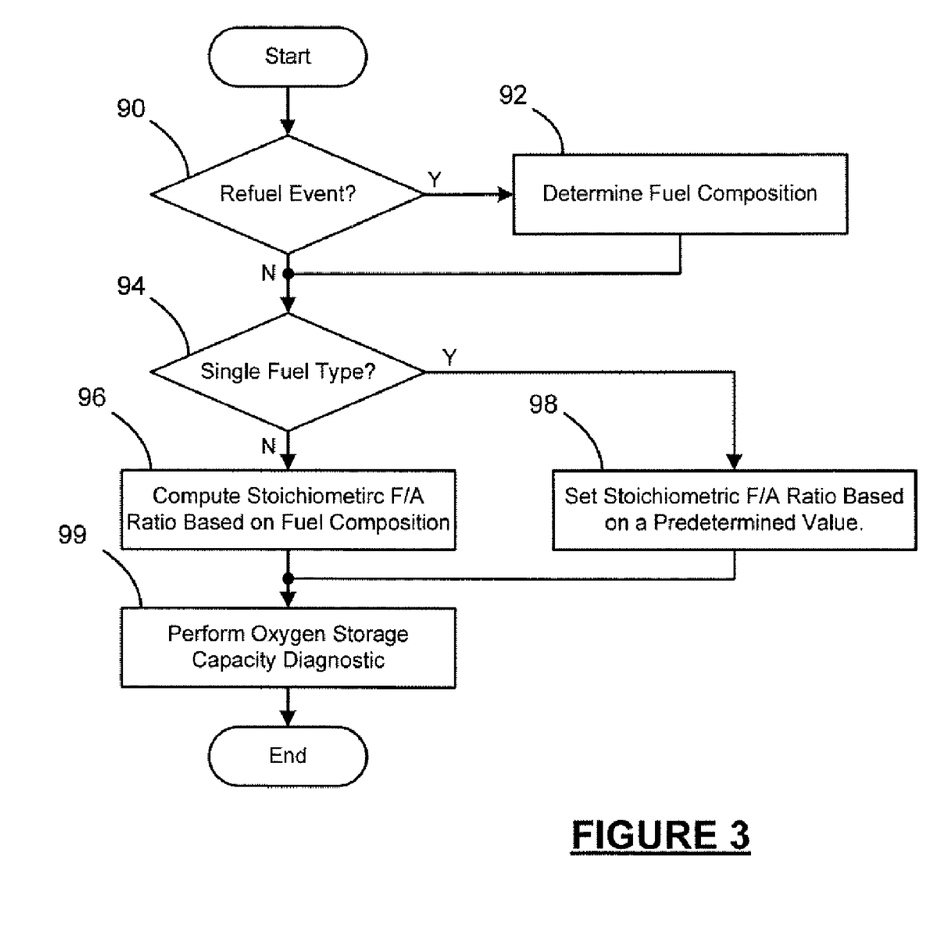
FIG. 3 is a flowchart illustrating a flexible fuel tolerant catalytic converter diagnostic method.

Referring now to FIG. 3, a flowchart illustrates a flexible fuel tolerant catalytic converter diagnostic method performed by the control module 16. The method may be run periodically during engine operation. Control evaluates whether a refuel event has occurred at 90. If a refuel event has occurred, the diagnosis is delayed until an accurate determination of the fuel composition is made at 92. Otherwise control proceeds to evaluate the current fuel composition at 94. If the fuel composition is of a typical fixed hydrocarbon mixture at 94, the stoichiometric F/A ratio is set based on a predetermined value at 96. If the fuel composition is of an alternative fuel mixture of more than one typical hydrocarbon, such as E85 (85% ethyl alcohol blended with 15% gasoline), the stoichiometric F/A ratio is computed based on the composition of the fuel mixture at 98. After setting the F/A ratio, control proceeds to perform the OSC diagnostic at 99.

Figure 4:
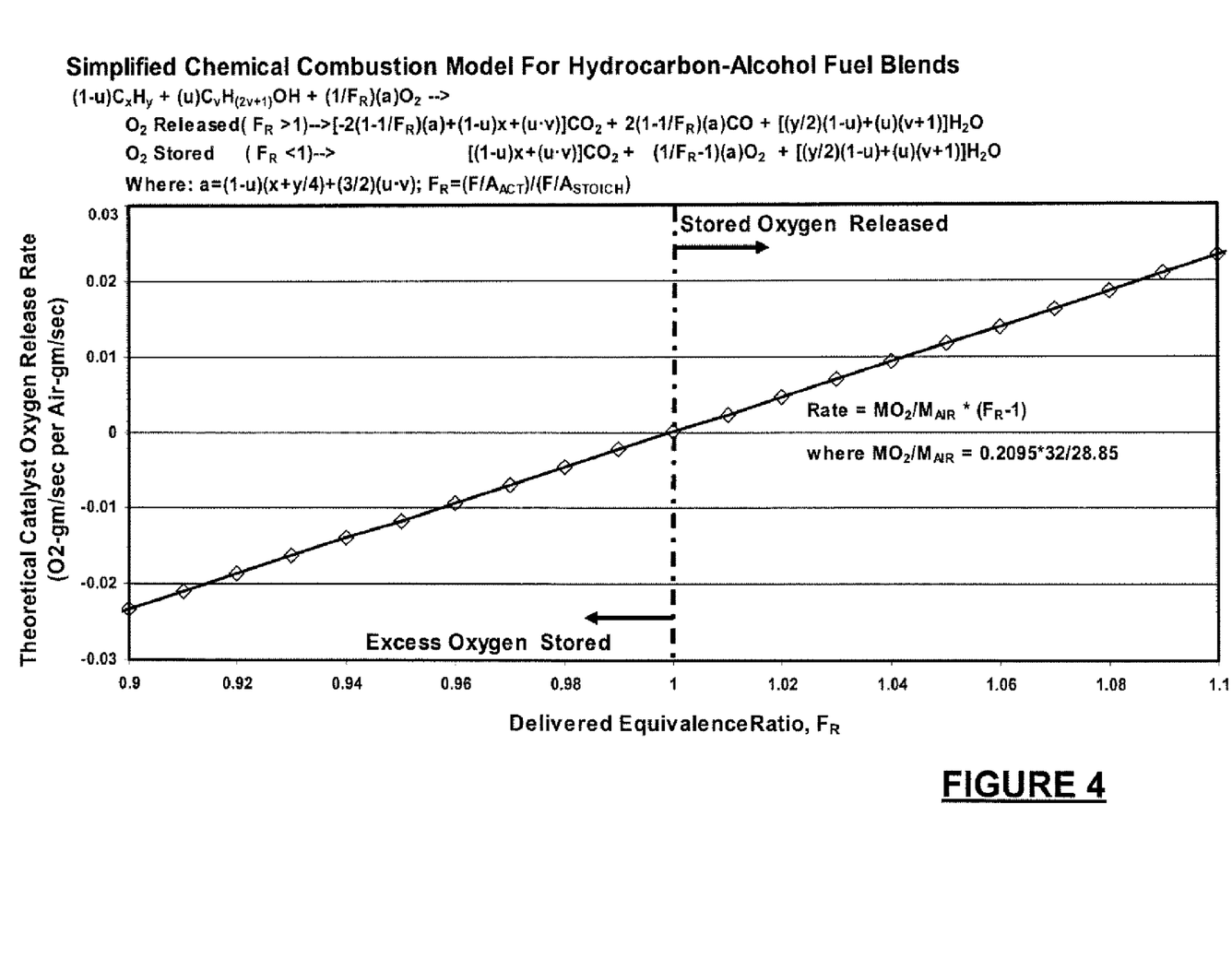
FIG. 4 is a graph illustrating a simplified chemical combustion model for fuel.

More particularly, the details of the OSC diagnostic module 46 of FIG. 2 and the process step 99 of FIG. 3 will be discussed in the context of FIGS. 4-7. Referring to FIG. 4, a simplified chemical combustion model for hydrocarbon and alternative fuels will be described in detail. The combustion model is based on an equivalence ratio ($F_R$) that is defined as the actual F/A ratio ($F/A_{ACT}$) divided by the determined stoichiometric F/A ratio ($F/A_{STOICH}$). During periods of $O_2$ release (i.e. rich engine operation), the chemical combustion model is provided as:

$$(1-u)C_XH_Y + (u)C_vH_{(2v+1)}OH +$$
$$(1/F_R)(a)O_2 \rightarrow [-2(1-1/F_R)(a) + (1-u)x + (u \cdot v)]$$
$$CO_2 + [2(1-1/F_R)(a)]CO + [(y/2)(1-u) + (u)(v+1)]H_2O.$$

During periods of $O_2$ storage, the chemical combustion model is provided as:

$$(1-u)C_XH_Y + (u)C_vH_{(2v+1)}OH + (1/F_R)(a)O_2 \rightarrow [(1-u)x + (u-v)]$$
$$CO_2 + [(1/F_R - 1)(a)]O_2 + [(y/2)(1-u) + (u)(v+1)]H_2O.$$

Where a, u, v, x are coefficients. The coefficient a represents a simplification constant determined from the following equation:

$$a = (1-u)(x+y/4) + (3/2)(u \cdot v).$$

The coefficient u represents the ratio of the alcohol in the fuel mixture of the total fuel mixture. The coefficient v represents the number of carbon atoms in a molecule of the alcohol fuel. The coefficient x represents the number of carbon atoms in a molecule of the non-alcohol hydrocarbon fuel. The coefficient y represents the hydrogen atoms in a molecule of the non-alcohol hydrocarbon fuel.

Periods of $O_2$ release require the catalyst to release ½ Mole of $O_2$ for each Mole of excess CO in the exhaust to completely convert the CO. Periods of $O_2$ storage require the catalyst to store one mole of $O_2$ for each mole of excess $O_2$ in the exhaust. The ratio of $O_2$ released by the catalyst to the mass of inlet $O_2$ in the F/A charge mixture is given as:

$$[2(1-1/F_R)(a)]/[2(1/F_R)(a)]=F_R-1$$

A positive term indicates $O_2$ release and a negative term indicates $O_2$ storage.

As seen in the graph of FIG. 4, when $F_R$ is greater than 1 (i.e. rich engine operation), stored $O_2$ within the catalytic converter 22 is released. When $F_R$ is less than 1 (i.e. lean engine operation), excess $O_2$ is stored. The rate of $O_2$ released to the mass air rate associated with the F/A mixture is provided as:

$$(M_{O2}/M_{AIR})(F_R-1); O_2 \text{ grams per sec/Air grams per sec}$$

$M_{O2}$ is the mass of $O_2$ in a mole of air. $M_{AIR}$ is the average molar mass of air. The molar ratio of $O_2$ to that of air is assumed to be a constant.

The OSC diagnostic is executed during a fuel cut-off mode of the engine 12. The fuel cut-off mode occurs during a vehicle overrun condition, such as when the vehicle 10 is coasting downhill. The fuel cutoff mode can be determined from the throttle position 60 and intake manifold pressure. While in the fuel cut-off mode, the F/A ratio of the exhaust stream from the engine 12 is equal to zero. The OSC diagnostic is initiated after the engine 12 has operated in the fuel cut-off mode for a predetermined period of time and is signaled to return to normal operation (or non fuel cut-off mode). More specifically, the predetermined time period is calibrated to completely saturate the catalytic converter 22 with oxygen.

Figure 5:
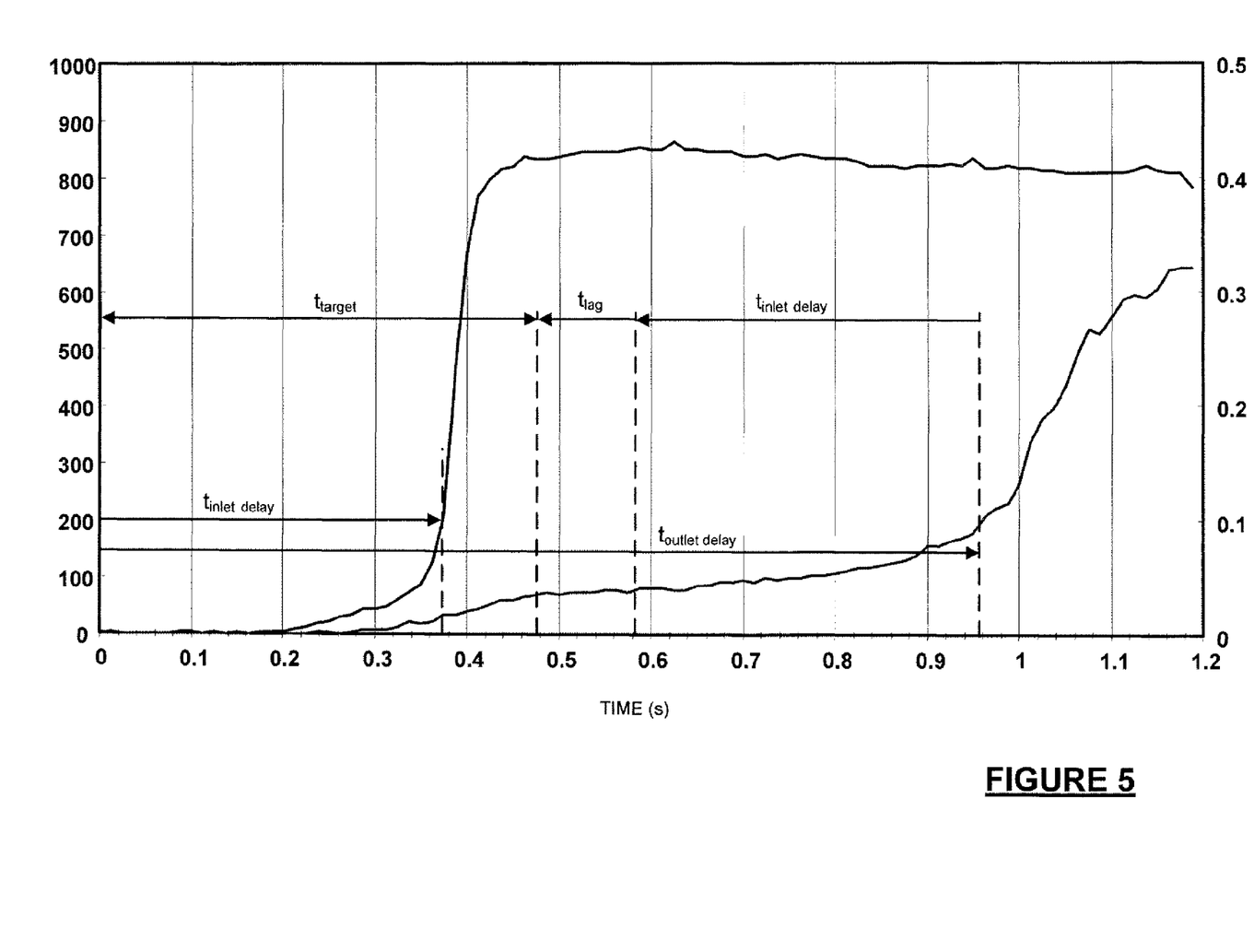
FIG. 5 is a graph illustrating inlet and outlet $O_2$ sensor responses during a data collection period.
Figure 6:
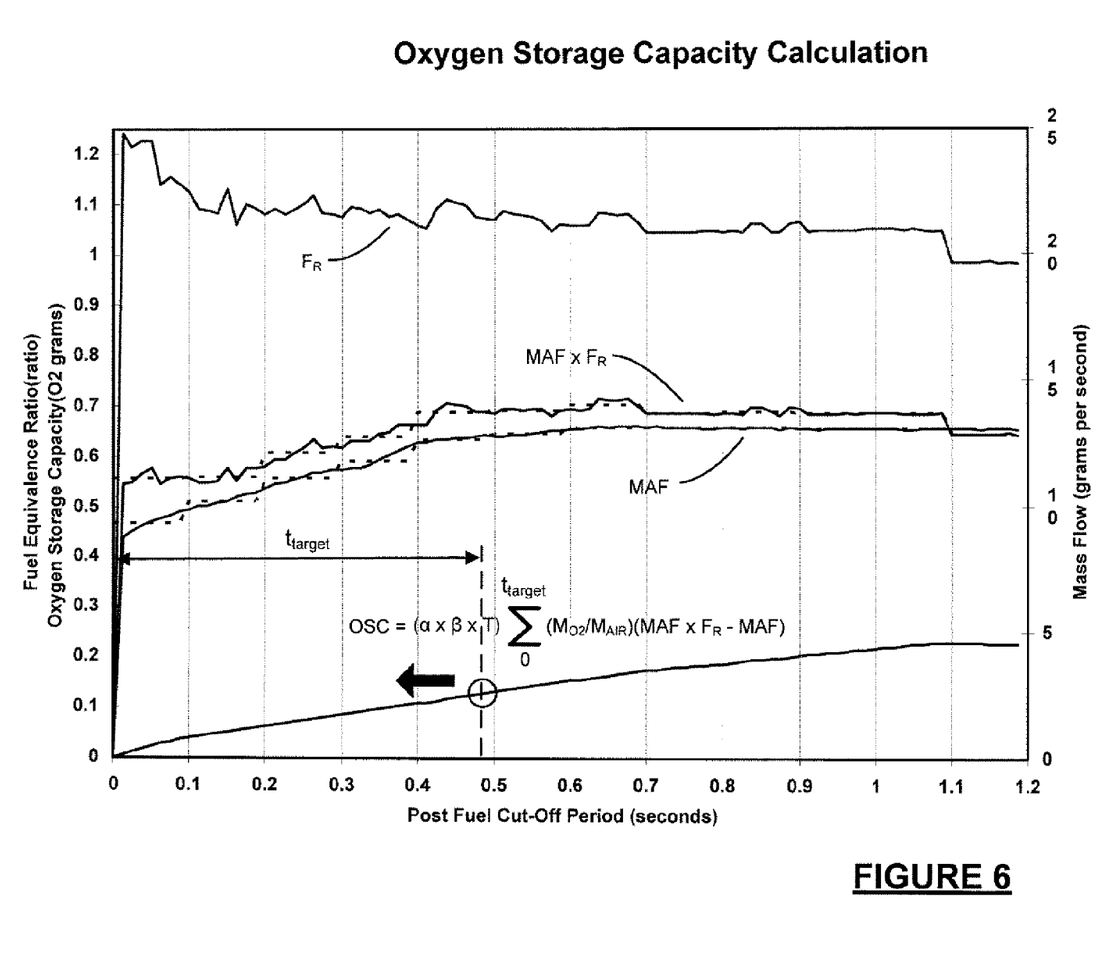
FIG. 6 is a graph illustrating an oxygen storage capacity (OSC) calculation.

Referring now to FIGS. 5 and 6, time t=0 indicates the beginning of the OSC diagnostic. Initially, $F_R$ is commanded to a fixed percentage rich. Commanding the equivalence ratio a fixed percentage rich results in $F/A_{ACT}$ being greater than $F/A_{STOICH}$. As the engine 12 operates rich, the inlet oxygen sensor 24 detects the transition to rich and correspondingly signals the control module 16. The delay time required for the inlet oxygen sensor 24 to achieve a reference signal is indicated as $t_{inlet\ delay}$. The reference signal indicates when the exhaust from the engine 12 achieves $F/A_{STOICH}$. The outlet oxygen sensor 26 detects the transition to rich and correspondingly signals the control module 16. The outlet oxygen sensor signal 64 is delayed relative to the inlet oxygen sensor signal 62. The transition time required for the outlet oxygen sensor 26 to achieve the reference signal is indicated as $t_{outlet\ delay}$. The lag time required for a predetermined amount of air (such as approximately 1.5 g) to flow through an inert catalytic converter 22 (FIG. 1) is indicated as $t_{lag}$.

The OSC diagnostic module 46 (FIG. 2) determines a target time over which a target OSC of the catalytic converter 22 (FIG. 1) is calculated. The target time, indicated as $t_{target}$, is based on $t_{inlet\ delay}$, $t_{outlet\ delay}$, and $t_{lag}$. More specifically, the OSC diagnostic module 46 monitors the inlet and outlet sensor signals 62, 64 to determine $t_{inlet\ delay}$ and $t_{outlet\ delay}$. The OSC diagnostic module 46 estimates $t_{lag}$ as the interval of time required to pass a fixed mass of air between the oxygen sensors as:

$$t_{lag}=K\text{ air\_mass\_grams}/MAF(t_{end-of-test})$$

This process assumes that exhaust flow conditions toward the end-of-test are known. Referring to FIG. 4, the end-of-test time can be estimated as:

$$t_{end-of-test}=t_{outlet\ delay}-t_{inlet\ delay}$$

This instant in time will vary with the OSC of the catalyst and cannot be determined until after the test conditions have passed. Also, the mass flow rate of air is transient in nature during the diagnostic and cannot be assumed to be constant. For these reasons, MAF 58 is averaged over fixed duration subintervals of the transition period and stored. The estimated lag period is then calculated by a backwards integration of the stored MAF 58 terms beginning at $t=t_{end-of-test}$ and ending when the summation equals K air_mass_grams. By definition, this occurs at $t=t_{end-of-test}-t_{lag}$. The target time is provided as:

$$t_{target}=t_{outlet\ delay}-t_{inlet\ delay}-t_{lag}$$

The target time is the time period immediately after F/A becoming greater than the stoichiometric F/A 56.

In addition to monitoring the above-described times, the OSC diagnostic module 46 stores subinterval averages of the mass air flow (MAF) into the engine 12 and an $F_R$ compensated MAF term (see FIG. 6). The subinterval is defined as an integer multiple of the data sample rate associated with the MAF and $F_R$ terms. This method does not preclude having the subinterval equal the sample rate and subinterval average based on a single value. However, a more efficient use of control module memory can be obtained without significantly affecting the accuracy of the OSC calculation by specifying a larger subinterval. The MAF 58 is provided as a signal to the control module 16 from the MAF sensor 20. The incremental OSC, derived from the simplified O2 release model, is represented by the following relationship:

$$\partial OSC=\alpha[MAF(t)\times\beta][F_R(t)-1]\partial t$$

where the incremental OSC is measured in terms of grams of stored oxygen per unit time, $\alpha$ is the mass of oxygen in a mole of air divided by the mass of a mole of air, and $\beta$ is the mass air flow fraction per catalytic converter. Preferably, for an exhaust system having a single catalytic converter 22 as shown in FIG. 1, $\beta$ is equal to 1. For an exhaust system having a catalytic converter for each N/2 cylinders, $\beta$ is equal to 0.5. The OSC at $t_{target}$ is represented by the numerical integration, or summation, of the incremental OSC over the target period:

$$OSC=\alpha\times\beta\times T\times\Sigma[MAF(nT)][F_R(nT)-1], n=0 \text{ to } t_{target}/T$$

where T represents the sampled data period, MAF(nT) represents the MAF at time nT, and $F_R(nT)$ represents the fuel equivalence ratio at time nT. A preferred equivalent form of this relationship is represented by:

$$OSC=\{\Sigma[MAF(nT)\times F_R(nT)]-\Sigma[MAF(nT)]\}\times(\alpha\times\beta\times T), n=0 \text{ to } t_{target}/T$$

This form is less prone to numerical accumulation of small round-off errors.

Once the outlet oxygen sensor 26 achieves the reference signal (i.e. detects $F/A_{STOICH}$ of the exhaust gases from the catalytic converter), the OSC diagnostic module 46 determines the target OSC. Referring again to FIG. 6, to determine the target OSC, the OSC diagnostic module 46 calculates the OSC according to the preferred OSC relationship stated previously. The OSC diagnostic module 46 integrates both the stored $F_R$ compensated MAF and stored MAF measurements over the target time. This corresponds to the area under each of their respective curves. The difference between these areas, graphically represented by the area between the two curves, is then multiplied by the constant term, $\alpha\times\beta\times T$ to obtain the OSC over the target period. The constant term acts as a scalar that optionally could be omitted if an unscaled result was desirable. The calculated OSC is compared to a reference OSC value to determine if the catalytic converter 22 passes or fails.

Figure 7:
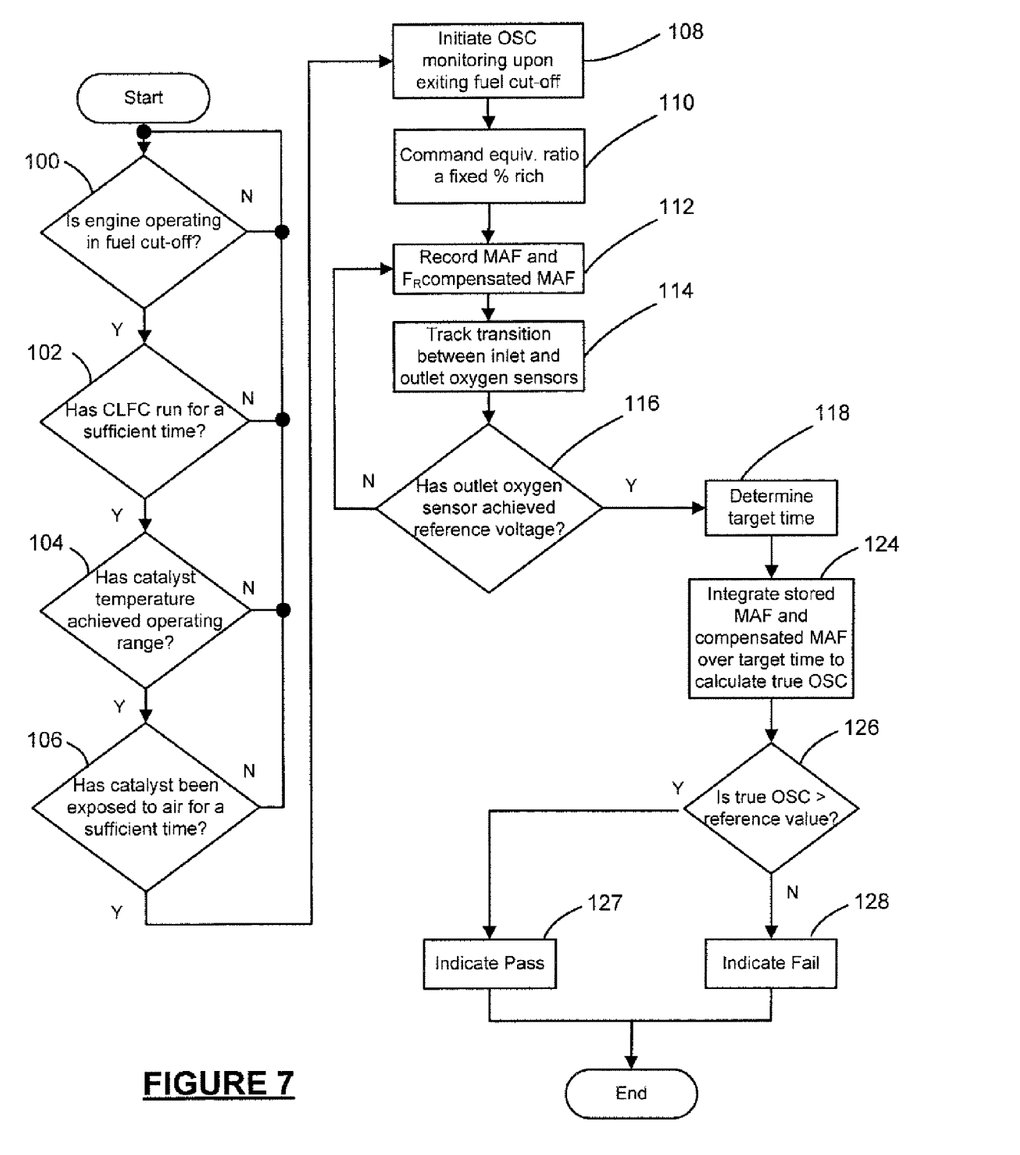
FIG. 7 is a flowchart illustrating an oxygen storage capacity (OSC) diagnostic method.

Referring to FIG. 7, a flowchart illustrates an OSC diagnostic method performed by the OSC diagnostic module 46 of FIG. 2 and shown in process step 99 of FIG. 3. Control determines whether a fuel cut-off mode is present at 100. If a fuel cut-off mode is not present, control loops back. Otherwise, control checks particular conditions at 102, 104, and 106 prior to initiating monitoring. At 102, control determines whether the engine 12 has been operating under closed loop fuel control (CLFC) for a sufficient time. If not, control loops back to monitor for a fuel cut-off mode at 100. If the engine 12 has been operating under CLFC for a sufficient time, control determines whether the catalytic converter 22 has achieved an operating temperature at 104. If the temperature has not been achieved at 104, control loops back to 100. If the temperature has been achieved, control continues at 106. At 106, control determines whether the catalytic converter 22 has been exposed to air flow for a time sufficient to achieve oxygen saturation. If the catalytic converter 22 has not been sufficiently exposed, control loops back to 100. If the catalytic converter 22 has been sufficiently exposed, control initiates the OSC diagnostic upon the engine 12 exiting the fuel cut-off mode at 108.

Upon exiting the fuel cut-off mode, control commands $F_R$ to a fixed percentage rich at 110. At 112, control continually records subinterval measurements of the MAF and $F_R$ compensated MAF using the MAF sensor 20 as explained above. At 114, control tracks the signals of the inlet and outlet oxygen sensors 24, 26. At 116, control determines whether the outlet oxygen sensor 26 has achieved the reference signal. If the outlet oxygen sensor 26 has achieved the reference signal, control continues at 118. If not, control loops back to 112. At 118, control determines $t_{outlet\ delay}$, $t_{inlet\ delay}$, $t_{lag}$, and $t_{target}$ therefrom. At 124, control integrates the stored OSC related quantities over the target time and obtains the target OSC value using the preferred difference equation provided above. At 126, control evaluates the target OSC value. If the target OSC is not above a reference value, test failure is indicated at 128. If the target OSC is above the reference value, test pass is indicated at 122.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A monitoring system for a catalytic converter, comprising:
    a fuel determination module that estimates a fuel composition of fuel in a fuel system using a learned shift in fuel trim calculated based on a signal from an oxygen sensor located at an inlet of the catalytic converter;
    a fuel/air (F/A) determination module that selectively determines a stoichiometric F/A ratio based on the fuel composition; and
    an oxygen storage capacity (OSC) diagnostic module that computes a target OSC based on the stoichiometric F/A ratio, that compares the target OSC to a reference value, and that diagnoses the catalytic converter based on the comparison.

2. The system of claim 1 wherein the F/A determination module sets the stoichiometric F/A ratio to a predetermined value when the fuel composition is a single specified hydrocarbon fuel.

3. The system of claim 1 wherein the F/A determination module determines the stoichiometric F/A ratio when the fuel composition is composed of a blend of more than one hydrocarbon fuel.

4. The monitoring system of claim 1 wherein the OSC diagnostic module sets an air/fuel ratio of an engine coupled to the catalytic converter to a predetermined rich condition, makes measurements based on the stoichiometric F/A ratio while the air/fuel ratio is set to the predetermined rich condition, and computes the target OSC based on the measurements.

5. The system of claim 1 further comprising an enable module that generates an enable signal after detecting a refuel event and wherein the fuel determination module postpones estimating the fuel composition until after the enable signal is received.

6. The system of claim 5 wherein the enable module detects the refuel event based on a current and a previous fuel level.

7. The system of claim 1 wherein the OSC diagnostic module initiates a rich condition based on the stoichiometric F/A ratio after a fuel cut-off period, computes a mass of oxygen released by the catalytic converter, and computes the target OSC over a target time period based on the mass of oxygen.

8. The system of claim 7 wherein the OSC diagnostic module determines the target time period based on an inlet delay time to detect a first F/A ratio and an outlet delay time to detect the first F/A ratio.

9. The system of claim 8 further comprising an inlet sensor that generates an inlet sensor signal indicating a first oxygen level of exhaust gases entering the catalytic converter and wherein the inlet delay time is determined based on the inlet sensor signal.

10. The system of claim 8 further comprising an outlet sensor that generates an outlet sensor signal indicating a second oxygen level of exhaust gases exiting the catalytic converter and wherein the outlet delay time is determined based on the outlet sensor signal.

11. A method of diagnosing a catalytic converter, comprising:
    estimating a fuel composition using a learned shift in fuel trim calculated based on a signal from an oxygen sensor located at an inlet of the catalytic converter;
    selectively determining a stoichiometric fuel/air (F/A) ratio based on the fuel composition;
    using a control module to compute a target oxygen storage capacity (OSC) of the catalytic converter based on the stoichiometric F/A ratio; and
    diagnosing the catalytic converter based on the target OSC.

12. The method of claim 11 further comprising receiving a fuel event signal indicating an occurrence of a refuel event and postponing the estimating the fuel composition until the fuel event signal is received.

13. The method of claim 11 wherein the selectively determining further comprises determining the stoichiometric F/A ratio to be a predetermined value when the fuel composition indicates a single specified hydrocarbon fuel.

14. The method of claim 11 wherein the selectively determining further comprises computing a stoichiometric F/A ratio when the fuel composition indicates a blend of more than one hydrocarbon fuel.

15. The method of claim 11 wherein the diagnosing comprises diagnosing the catalytic converter based on a comparison of the target OSC and a reference value.

16. The method of claim 11 further comprising setting a malfunction code based on the diagnosing of the catalytic converter.

17. The method of claim 11 further comprising:
setting the air/fuel ratio to a predetermined rich condition;
making measurements based on the stoichiometric F/A ratio while the air/fuel ratio is set to the predetermined rich condition; and
computing the target OSC based on the measurements.

18. The method of claim 11 further comprising:
saturating the catalytic converter with oxygen during a fuel cut-off period;
operating an engine in a rich condition based on the stoichiometric F/A ratio after the fuel cut-off period;
computing a mass of oxygen released by the catalytic converter based on mass air flow into the engine; and
wherein the computing the target OSC is further based on the mass of oxygen released over a target time period.

19. The method of claim 18 wherein the computing further comprises:
determining a first delay time for an inlet oxygen sensor to detect a first F/A ratio;
determining a second delay time for an outlet oxygen sensor to detect the first F/A ratio; and
computing the target time period based on the first and the second delay times.

20. The method of claim 19 further comprising:
determining a transport lag time required for a mass of air to flow through an inert catalytic converter; and
calculating the target time period based on the transport lag time.

* * * * *